United States Patent [19]

Baldwin

[11] 4,189,843
[45] Feb. 26, 1980

[54] PIPE THREAD GAUGE

[75] Inventor: John R. Baldwin, Houston, Tex.

[73] Assignee: Mustang Services Company, Houston, Tex.

[21] Appl. No.: 905,724

[22] Filed: May 15, 1978

[51] Int. Cl.$^2$ .......................... G01B 3/40; G01B 3/48
[52] U.S. Cl. ................................ 33/199 R; 33/143 M
[58] Field of Search ............ 33/199 R, 143 R, 143 M, 33/143 K, 147 M, 149 R, 158, 159, 160, 174 E, 174 H, 174 S, 199 B

[56] References Cited
U.S. PATENT DOCUMENTS

| 1,950,912 | 3/1934 | Aronson | 33/199 X |
|---|---|---|---|
| 2,668,359 | 2/1954 | Litchfield | 33/143 M |
| 2,852,856 | 9/1958 | Cox | 33/199 R |
| 3,432,935 | 3/1969 | Reish | 33/199 R |

*Primary Examiner*—Willis Little
*Attorney, Agent, or Firm*—William R. Laney

[57] ABSTRACT

A gauge for determining the pitch diameter of threads on pipe and tubing, for determining the taper of a thread on the pin or box end of tubular structures used in oil and gas exploration an production, and for determining the existence of an out-of-round condition at the location of the threads on such tubular structures. The gauge includes an elongated scale rail, a pair of blade blocks slidably mounted on the scale rail, and a pair of thread engaging blades pivotally supported on the blade blocks. Locking and adjusting elements are provided in association with the blade blocks for locking the blade blocks in a fixed spatial relationship to each other along the length of the scale rail, with the distance therebetween precisely adjusted to a predetermined value. A series of interchangeable blade stop plates are provided for individual cooperative interaction with the thread engaging blades and with the blade blocks to set the blades at a preselected angle in relation to each other in correlation to a specific thread taper dimension which is to be gauged. A set of interchangeable pitch diameter bars can optionally be provided for fixing the distance separating the thread engaging blades at a selected value corresponding to a predetermined pipe thread pitch diameter.

20 Claims, 13 Drawing Figures

PIPE THREAD GAUGE

BACKGROUND OF THE INVENTION

1. Field of the Invention

This invention relates to devices having utility in the gauging or measuring of certain properties of threads placed on the end of tubular goods, and more particularly, to a device for measuring the pitch diameter of threaded pipe ends and the like, and for determining the taper of the threads placed in frusto-conical array on the inner or outer sides of the ends of tubular members. The device also has utility in determining the existence in a threaded pipe end of an out-of-round condition.

2. Brief Description of the Prior Art

In the production of oil and gas, a number of situations are encountered in which elongated strings or courses of tubing sections joined in end-to-end relation are utilized for conveying fluids. In many of these situations, it is of considerable importance to proper performance and extended service life of the tubing or pipe string in use that the joints between sections of the pipe or tubing be made up to provide a strong, durable connection without looseness or play. In the assembly of casing strings used to case oil and gas wells, for example, it is of major importance that a tight connection or joint be formed between sections or lengths of casing, particularly at the joints near the upper end of the string where the joint is under the greatest stress due to the great weight of the lower portion of the tubing string which hangs from such upper joints. If the joint is not more than merely hand tight, joint failure or unthreading may occur, and a major portion of the string dropped in the well bore with very serious technical and economic problems resulting. It is also important that a casing string joint not be made up excessively tight by threading, because this results in undesirable galling of the threads.

In order that relatively high precision can be obtained in the making up of casing string joints, as well as in other situations where the threaded ends of two tubular members are to be joined, it is important that the size and configurations of threads used on the ends of such joined sections be standardized, and that the tightening procedures used in effecting joinder also be standardized in correlation to the way in which the standardized threads fit in each other within the joint. To this end, standards specifying the size configuration and orientation of threads on the end of tubular goods used in the oil and gas industry have been specified within that industry, and such standards have been published in the United States in the Specification for Threading, Gauging and Thread Inspection of Casing, Tubing, and Line Pipe Threads, as promulgated by the American Petroleum Institute. This publication sets forth the standard dimensions which will be characteristic of pitch diameter for various types of tubing and casing threads, and for the various outside diametric dimensions of such pipe and tubing. Dimensional figures are also provided which standardize the distance or length from the end of the particular thread-carrying pipe in question to the plane through the threads in which the pitch diameter is mesured. Finally, there is generally specified, where a tapered thread is involved, such as in pin and box connections, a standard dimension of taper which is to characterize the various diametric sizes of such pipe.

Where threaded pipe and tubular goods carry threads which conform to the specified standards, and proper and standard procedures are used in making up the joints by which sections of such pipe and tubular goods are interconnected, no difficulty is normally experienced as a result of failure of the joints, or of shortened service life of the threads carried by the pipe or tubular goods sections so joined by galling of the threads.

To enable a check to be made of the conformity of threads used on casing and other tubing, line pipe and the like to the prescribed standards, the published standards have further provided certain standard gauging procedures, and have made reference to certain types of gauging devices which are advocated for use in measuring the critical dimensions and configurations of threads. It is theorized that by the use of these gauges and gauging procedures, it can be quickly and accurately determined, in a field location, where threaded pipe ends conform to standards and thus can be safely joined, assuming proper joining procedures are utilized, and whether a particular pipe section which carries a female joint or box is properly threaded to facilitate a perfect or at least acceptable threaded joinder to the male or pin end of another section of pipe. Annular ring gauges have been advocated for use in determining the conformity to standards of the pitch diameter, taper and the like of threaded pipe ends. These gauges encircle the threaded pipe end and are moved to a certain axial position along the thread to determine whether the pitch diameter, standoff and other dimensional parameters are standard, or vary from the standard. Certain other types of gauges are used for measuring and determining a cross-sectional configuration of the individual threads, and the proper spacing between crests and troughs of the individual threads.

The types of gauges which have been used in the field for the described purposes have generally, when of the ring gauge type, been time consuming, and to some extent difficult, to use, and have not always provided an accurate indication of the performance capability of the thread being measured. For example, a ring gauge, which capable of measuring and establishing some average diameter which may be interpreted or calculated as the measured pitch diameter, nevertheless is not generally capable of detecting pipe ends which are out-of-round, and which therefore do not have the same diametric dimensions throughout the entire outer peripheral circumference of the pipe. Further gauges currently in use are frequently less than adequate in measuring the factory-coated threads of the box end of a casing section. Such box ends are very frequently damaged in the course of manufacture and subsequent handling by the use of high compressive forces developed by lifting tongs applied to the box end, with the result that distortion of the threads from a truly round or circular configuration occurs, and this anomaly is frequently not detected by the use of the types of gauges currently employed.

A thread gauge which is very useful for gauging pipe threads in the field is illustrated and described in McGaffey U.S. Pat. No. 2,874,475. This instrument can be used for sorting drill pipe to match pin and box ends carried on the pipe so that properly interfitting joints can be realized. Basically, the McGaffey gauge includes an elongated bar having a pair of gauge blocks mounted on the bar, and movable relative to each other. The blocks each carry a pivotally supported gauge arm which can be pivoted to adjust the angle at which the gauge arms extend to each other in a common plane which they occupy.

Although the McGaffey thread gauge can be used for measuring both the taper of a thread course on the end of a pipe, and the end diameter or thread base diameter over a given length of thread, the McGaffey gauge, because of its dependence in use upon abutment of a pipe end against the described base bar, and its dependence upon either end diameter or thread base diameter, does not undertake to gauge the pitch diameter of the thread and thus does not facilitate an accurate determination of the "standoff" between the pin and box in a pin and box joint. The parameter of "standoff" is of substantial importance in determining the tightness of a joint which will be formed between the pin and the joint. The joint tightness is related to the so-called "axial draw." The "diameter draw" is the progression in size of the thread taper which is caused by the longitudinal travel of the interconnected pin and box in undergoing axial draw.

BRIEF DESCRIPTION OF THE PRESENT INVENTION

The present invention provides a thread gauge for gauging the pitch diameter and the taper of threads formed on the ends of pipe and tubing in such a way that, with the aid of prescribed pipe thread standards, the diameter draw and axial draw which will be experienced in interconnecting pipe sections to each other can be determined, and joints formed after such gauging can be optimized in tightness. Further, in addition to facilitating the measurement of pitch diameter and taper, the thread gauge of the invention can be used for cutting a new thread on a pipe end to a prescribed pitch diameter and taper. The thread gauge of the invention, while bearing many similarities to the McGaffey thread gauge described in U.S. Pat. No. 3,472,475, permits certain additional functions and uses to be realized which are quite valuable in enabling a person in the field to know precisely the type of threaded pipe ends which are in use or to be used, and the type of joints which can be expected to result from the use of pipe sections carrying such threaded ends.

Broadly described, the thread gauge of this invention includes an elongated scale rail, a pair of blade block assemblies which are slidably mounted on a scale rail, and a pair of elongated thread-engaging blades which are pivotally supported on the blade blocks. In this general description, my gauge is like that described in the McGaffey patent.

In the gauge of this invention, locking and adjusting elements are provided in association with the blade blocks for locking the blade blocks in a fixed spatial relationship to each other along the length of the scale rail, and means is provided in association with the scale rail for precisely measuring or setting the distance which separates the thread engaging blades so that a predetermined or sought pitch diameter can be identified on a threaded pipe end by placing the thread engaging blades in contact with the crest of the threads over the length of the taper at opposite sides of the pipe end which carries the thread. The correlation between the measuring device utilized on the rail for measuring the distance between the blades and the length of the blades is such that when a given thread taper correlation is established by establishment of the angle at which the two thread engaging blades extend to each other, the end of the pipe which carries the thread will not extend to the point where it is in contact with or even in close proximity to the scale rail.

A series of interchangeable blade stop plates are provided for individual cooperative interaction with the thread engaging blades and with the blade blocks for the purpose of setting the blades at a preselected angle in relation to each other in correlation to a specific thread taper dimension which is to be gauged.

In one embodiment of the invention, a set of interchangeable pitch diameter bars are provided for fixing the distance which separates the thread engaging blades at a selected value corresponding to a predetermined pipe thread pitch diameter.

An important object of the invention is to provide a thread gauge which is easily used by one having relatively little or no skill in trignometry, and can be used by such persons in an oil field environment for measuring, on the spot, the thread characteristics of threads carried on the ends of pipe and tubing.

A further object of the invention is to provide a thread gauge which can be used for determining the existence of an out-of-round condition in the thread formed about or within the end of a pipe or tubular member.

A further object of the invention is to provide a precision thread gauge which can precisely and exactly mesure the pitch diameter which is characteristic of the thread course disposed on substantially any type of tubular element.

Additional objects and advantages of the invention will become apparent as the following detailed description of preferred embodiments of the invention is read in conjunction with the accompanying drawings which illustrate such preferred embodiments.

BRIEF DESCRIPTION OF THE DRAWINGS

FIG. 3 is an end elevation view of the thread gauge of the invention as it appears when viewed from the right end of the gauge as it is depicted in FIG. 1.

DETAILED DESCRIPTION OF PREFERRED EMBODIMENTS OF THE INVENTION

The thread gauge of the invention includes an elongated scale rail designated by reference numeral 10. The scale rail 10 includes an elongated, relatively flat plate 12 of rectangular configuration. The plate 12 defines an elongated slot 14 extending from a point adjacent one end of the plate to a point near the other end thereof. Affixed to the plate 12 adjacent one of the edges thereof is a scale bar 16 which carries longitudinally spaced indicia 18 constituting graduations used for measuring distances along the scale bar for a purpose hereinafter described. In a preferred embodiment of the invention, the scale bar 16 is formed integrally with the elongated plate 12 in the manner best illustrated in FIGS. 3 and 4, and extends normal to the major plane of the plate 12. The scale bar 16 carries a flat upper slide surface 16a which extends over its length, and a parallel, flat lower surface 16b which also extends over its length.

Slidably mounted upon the rail 10 are a pair of blade block assemblies designated generally by reference numerals 20 and 22. The scale block assemblies 20 and 22 are substantially identical in configuration and construction, and each includes an L-shaped rear block 24 and a forward block 26. The L-shaped rear block 24 includes a back plate 27 which flatly abuts against the rear side of the plate 12 of the rail 10, and is apertured to receive a pair of tightening screws 28. A foot plate 30 is joined and extends normal to the back plate 27 so as to project under a lower side of the scale bar 16. The foot plate 30 has a pair of threaded apertures formed therethrough so that set screws 32 and 34 can be extended through these apertures and into engagement with the lower side 16b of the scale bar 16. The screws 28 which are projected through each back plate 27 are also extended through aligned apertures formed in the forward block 26 by way of the slot 14.

It will be perceived from the description thus far that the L-shaped rear block 24 and the front block 26 are retained in engagement with each other and surround the lower portion of the scale rail 10 and scale bar 16, with the lower edge of the forward block 26 riding along the upper surface 16a of the scale bar. By loosening the tightening screws 28 by means of an Allen wrench or the like, and by hand releasing the set screws 32 and 34 from their engagement with the lower surface 16b of the scale bar 16, the respective blade block assembly 20 or 22 can be slid longitudinally along the rail 10. Moreover, the two blade block assemblies 20 and 22 can be selectively spaced from each other along the rail 10. Each of the forward blocks 26 in each blade block assembly 20 and 22 carries a triangularly shaped indicator 36 which points downwardly, and can be used to correlate the position of the respective blade block assembly 20 or 22 to a particular one of the indicia 18 along the scale bar 16. In this way, a gross or course measurement of the distance between the two blade block assemblies can be obtained by reading from the graduations constituted by the indicia 18 on the scale bar 16. It will be apparent, of course, that each of the blade block assemblies 20 and 22, when it has been moved to a desired position on the rail 10, can be set in that location by setting up or tightening the set screws 32 and 34. On some occasions, it may be desirable to somewhat permanently set one of the blade block assemblies at a particular location on the scale rail 10 by tightening up the tightening screws 28 to draw the front block 26 and L-shaped rear block 28 toward each other, and thus clamp the elongated plate 12 of the rail 10 between these two blocks of the particular blade block assembly. To assist in this function, and to assure that the blade block assembly will remain square with respect to the rail 10, a stop block assembly 40 is provided. The stop block assembly 40 includes a front plate 42 and a back plate 44 (see FIG. 5) interconnected through the elongated slot 14 formed in the plate 12 by suitable fastening screws 46 and 48 which can be loosened and tightened to permit the stop block assembly 40 to be slid along the rail 10 to a selected position. It will be noted that the lower edge of the front plate 42 of the stop block assembly 40 rests flatly against the upper surface 16a of the scale bar 16, and that the front plate 42 carries a pair of side edges 42a and 42b which extend normal to its lower edge or, stated differently, normal to the upper surface 16a of the scale bar 16.

Figure 1:
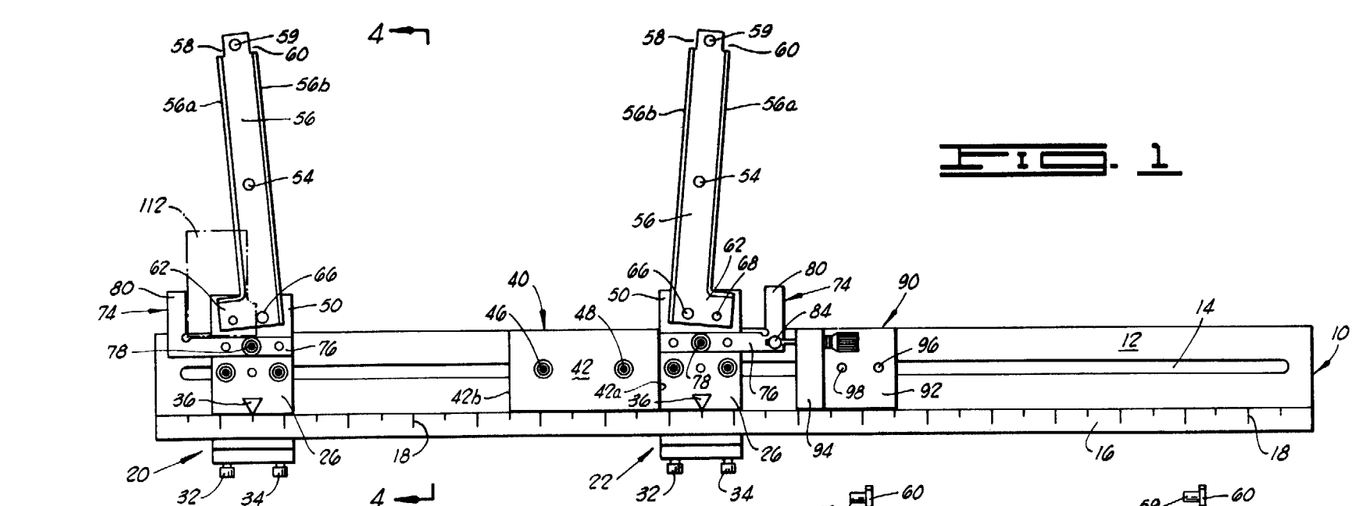
FIG. 1 is a side elevation view of a preferred embodiment of the thread gauge of the invention.
Figures 2, 4, 5:
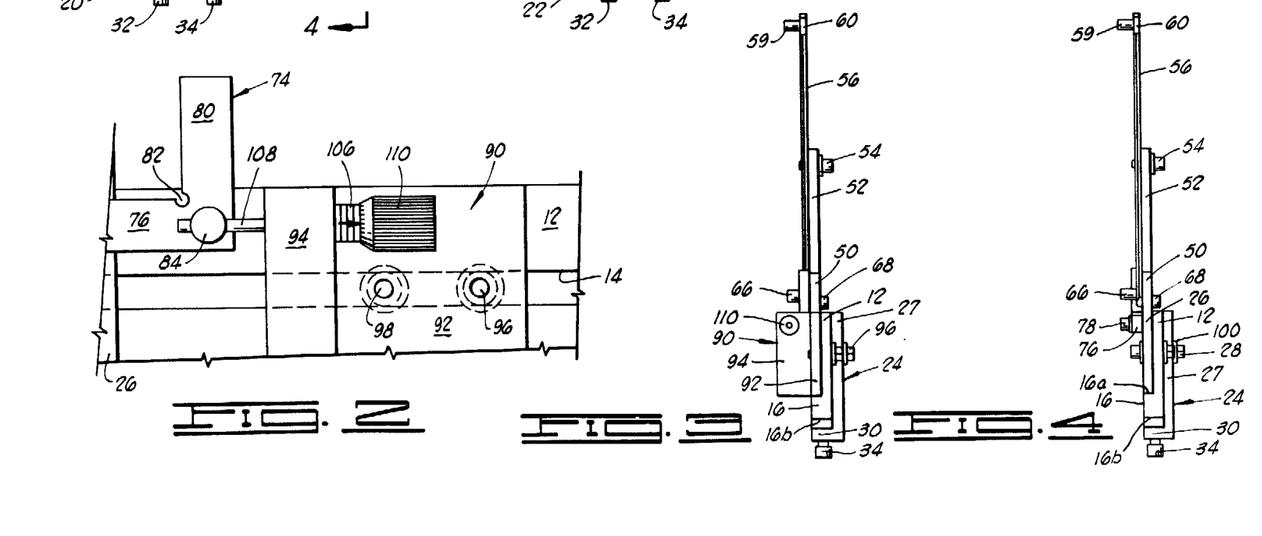
FIG. 2 is an enlarged detail view of a micrometer assembly utilized for finely setting the distance by which the thread engaging blades forming a part of the gauge of the invention are spaced from each other.
FIG. 4 is a sectional view taken along line 4—4 of FIG. 1.
FIG. 5 is a rear elevation view of the thread gauge illustrated in FIG. 1.

It will be noted in referring to FIGS. 1, 3 and 5 that each of the forward blocks 26 in each of the blade block assemblies 20 and 22 has an upwardly extending portion 50 which projects above the upper side of the plate 12 of the rail 10. Additionally, each of the forward blocks 26 also includes an upwardly extending, elongated pivot neck 52 which can be formed integrally with the portion 50 of the forward block. In the illustrated embodiment, the pivot neck 52 of each forward block 26 in each blade block assembly 20 and 22 is of substantially rectangular configuration, and the longitudinal axis of each rectangular pivot neck extends substantially normal to the longitudinal axis of the rail 10 and the scale bar 16 carried thereby.

Near its upper end, each of the pivot necks 52 is apertured to accommodate a pivot pin 54. The pivot pin 54 is provided to facilitate pivotal attachment to the respective pivot neck of an elongated thread engaging blade 56. Each thread engaging blade 56 can thus pivot about a horizontal axis at the location of its respective pivot pin 54. Each thread engaging blade 56 is an elongated generally rectangular element having a pair of right angle notches 58 and 60 formed at opposite sides of the upper end thereof. The rear side of each of the thread engaging blades 56 is flat, as illustrated in FIG. 5, and the forward face or side of each blade tapers at the opposite longitudinal edges thereof to a rather sharp well-defined edge. These opposed blade edges are denominated in FIG. 1 by reference numerals 56a and 56b. Adjacent the upper end of each of the thread engaging blades 56, and located between the notches or reliefs 58 and 60, is a bar pin 59 which projects normal to the major plane of the respective thread engaging blade 56 and toward the forward side of the blade in the manner illustrated in FIGS. 3 and 4.

At the lower end of each of the thread engaging blades 56, or stated differently, at its end opposite its end which carries the notches or reliefs 58 and 60, each thread engaging blade has formed integrally therewith and as a part thereof, a toe portion 62 which projects from the side 56a of the blade 56 in a direction normal to the longitudinal axis of the blade. Projecting from the forward side of each of the blades 56 at a location relatively near to the lower edge of the blade, and in alignment with the longitudinal axis thereof, is a stop pin 66. The toe portion 62 of each thread engaging blade 56 has secured therein, and projecting from the back or rearward face of the respective blade and toe portion, a guide and locking screw 68 (see FIG. 5). The guide and locking screw 68 of the toe portion 62 of each thread engaging blade 56 rides in, and is stabilized by, an arcuate slot 70 formed through the upwardly extending portion 50 of each of the forward blocks 26 of each blade block assembly 20 and 22.

In the case of each of the blades 56, the distance which separates the pivot pin 54 from the stop pin 66 along the longitudinal axis of the respective blade 56 is preferably three inches for a reason which will be hereinafter described. It will be apparent from the description which has thus far been set forth concerning the interrelationship between each of the blade block assemblies 20 and 22 and the respective thread engaging blade 56 which is pivotally carried on the upwardly extending pivot neck 52 forming part of such assemblies, that each thread engaging blade can pivot about a horizontal axis, and in undergoing such pivotation, the guide and locking screw 68 swings along an arcuate path conforming to the curvature of the respective arcuate slot 70. The guide and locking screw 68 is, at this time, in a loosened or releasing position, but can be tightened at any point so as to lock or fix the respective thread engaging blade 56 in a desired angular position in relation to the longitudinal axis of the scale rail 10. Stated differently, by this means, the two thread engaging blades can be set in a predetermined angular relationship to each other to facilitate engagement of a tapered thread formed on the pipe end in a manner hereinafter described.

Fixedly secured to the outer face of each of the forward blocks 26 of each blade block assembly 20 and 22 is an angled blade stop plate bracket designated generally by reference numeral 74. Each stop plate bracket 74 is of L-shaped configuration, having a relatively long, horizontally extending leg 76 which projects transversely across the front face of the respective forward block 26 and is secured thereto by a suitable fastening device 78 and a relatively short, vertically extending leg 80 which extends normal to the leg 76 and projects upwardly to a level above the upper longitudinal edge of the plate 12 of the rail 10.

At the inside corner at the intersection of the legs 76 and 78 of the stop plate bracket 74, a notch 82 is cut out which projects into the bracket 74 for a purpose hereinafter described. It should be noted that the transverse thickness of the blade stop plate bracket 74 is substantially greater than that of each thread engaging blade 56 and the toe portion 62 carried thereon, and also it is important to note that the legs 76 and 80 of each bracket 74 extend precisely at a right angle to each other and are defined by outer side edges which are perfectly straight. It will further be noted in referring to the blade stop plate bracket 74 carried on the blade block assembly 22 that a micrometer rod stop pin 84 is secured to the bracket at the outside corner thereof where the legs 76 and 80 intersect.

In order to provide a fine adjustment of the linear spacing which separates the two blade block assemblies 20 and 22 from each other, and which therefore also separates the thread engaging blades 56 on each of these assemblies from each other, a micrometer assembly, designated generally by reference numeral 90, is provided. The micrometer assembly 90 includes a slide plate 92 which bears flatly against the forward face of the plate 12 of the rail 10 and has secured thereto an outwardly projecting screw block 94. This screw block 94 extends normal to the major plane of the slide plate 92, and normal to the major plane of the plate 12 of the rail 10. It will also be noted that the slide plate 92 is rectangular in configuration and has a lower edge which bears flatly against the upper surface 16a of the scale bar 16, so that the micrometer assembly can track along the scale bar when it is moved along the rail 10 in a manner and for a purpose hereinafter described.

A pair of tightening screws 96 and 98 are threaded into the slide plate 92 of the micrometer assembly 90 and project through the slot 14 in the plate 12. On the opposite side of the plate 12 from the slide plate 92, the tightening screws 96 and 98 carry heads which cooperate with washers 100 and 102 which frictionally engage the plate 12 when the screws 96 and 98 are tightened, and thereby lock the micrometer assembly in a selected location along the rail 10.

The screw block 94 has a threaded bore formed therethrough in a direction parallel to the face of the plate 12 and in a position of alignment with the micrometer rod stop pin 84 carried on the blade stop plate bracket 74. Threaded into the threaded bore in the screw block 94 is a micrometer barrel 106. Received within the micrometer barrel 106 is an extendible micrometer rod 108 which can be reciprocated with respect to the barrel 106 by rotating a knurled micrometer knob 110. When the knurled micrometer knob 110 is rotated, indicia carried thereon pass by a reference index marker retained on the micrometer barrel 106 to provide a micrometric indication of the extent to which the micrometer rod 108 is extended, which micrometric indication or reading can be used to supplement the coarser reading obtained upon the scale bar 16 in identifying the precise distance which separates the two blade block assemblies.

Figures 5, 6, 7, 8, 9:
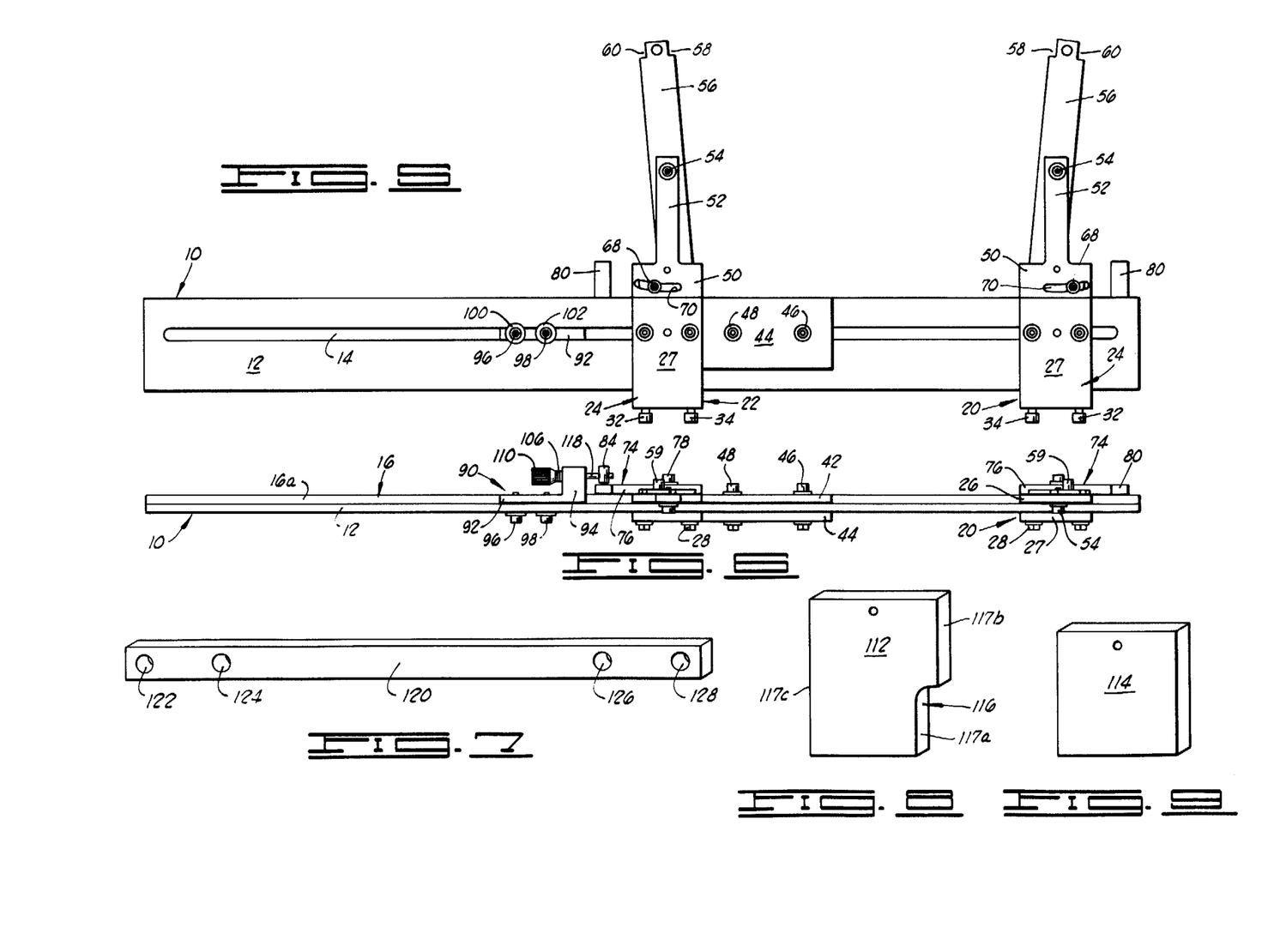
FIG. 6 is a plan view of the thread gauge of the invention.
FIG. 7 is a standard pitch diameter bar typical of those which can be used in combination with the thread gauge of the invention for the purpose of gauging a pre-set diameter of a thread on the end of a pipe.
FIG. 8 is an isometric view of a blade stop plate used in conjunction with certain parts of the invention for setting the angle of the two thread blades with respect to each other.
FIG. 9 is an isometric view of another of the blade stop plates used in conjunction with other portions of the thread gauge for setting a preselected angular relationship between the thread engaging blades forming a part of the gauge.

In FIGS. 8 and 9 of the drawings, a pair of blade stop plates 112 and 114 are illustrated. The blade stop plates 112 and 114 are utilized, in a manner hereinafter described, for precisely setting the angle at which the respective thread engaging blades 56 extend with respect to the longitudinal axis of the rail 10 and the scale bar 16. Referring initially to the blade stop plate 112, it will be perceived that this plate is basically rectangular in configuration with a notch or relief 116 formed in one corner of the plate. Except for the provision of the notch or relief 116 at one corner of the plate 112, each of the corners of the plate is precisely right angular in configuration.

As contrasted with the configuration of the blade stop plate 112, the blade stop plate 114 is square in configuration.

The position or location of the blade stop plates when they are in use as a portion of the gauge of the invention is typified by the dashed line position of the blade stop plate 112 illustrated in FIG. 1. In referring to this illustration, it will be noted that the blade stop plate 112 is set within and upon the blade stop plate bracket 74, with its edge opposite the relatively short edge flatly abutting the upper edge of the relatively long leg 76 of this bracket, and one of its side edges opposite that side which carries the notch 116 flatly abutted against the inner side edge of the relatively short leg 80 of the bracket. It will also be noted that the toe portion 62 of the thread engaging blade 56 forming a part of the blade block assembly 20 projects between a portion of the stop plate 112 and the outer or forwardly facing surface of the forward block 26 of the blade block assembly 20.

Finally, it will be noted that the stop pin 66 bears against that straight edge portion of the stop plate 112 which extends from, and substantially parallel to, the edge portion formed at the inner side of the relief 116. This inner edge portion or inner side of the relief will be referred to as a first segment, 117a, of the side carrying the relief, and the other segment of this side is designated by reference numeral 117b.

It should be here pointed out that the manner of pivotally mounting the thread engaging blades 56 and positioning of the blade stop plates (as typified by the stop plates 112 and 114) for cooperation with the stop pin 66 carried on each thread engaging blade 56 is such that each blade acts as a portion of a sine bar assembly. By precalibrating each of the blade stop plates 112 and 114, as well as a series of others, a precise angular relationship of the longitudinal axis or, more importantly, the edges 56a and 56b of each blade 56 with respect to the longitudinal axis of the rail 10 and the scale bar 16 can be obtained.

It should also be pointed out here, and will be better understood from the ensuing description, that the notched or relieved stop plate 112, as well as all other such stop plates provided with a similar notch at one corner thereof, can be inverted in use from its illustrated position. In such inverted position, the notch or recess 116 is inverted so that the stop pin 66 then will come in contact with the segment which corresponds to the segment 117b in the ilustrated stop plate 112. Stated differently, the side edge of the stop plate 112 in which the relief or recess 116 is located can be said to have two parallel offset segments, and, as shown in FIG. 8, these segments differ in their distance of spacing from opposed side edge 117c. This difference in spacing is such that when the stop pin 66 is against the segment 117a, the angulation of the respective thread engaging blade 56 is appropriate for gauging the taper of a box end on a pipe section, and when it is against the segment 117b, the angulation of the blade is reversed, and is appropriate for gauging the taper of a pin end type thread which is cut to correspond to, and be joined with, such box end.

A final element of the gauge of the invention is illustrated in FIG. 7 of the drawings. A pitch diameter bar 120 is here shown, and constitutes an elongated bar having a pair of spaced circular holes or apertures 122 and 124 formed at the left end thereof, and a similar pair of spaced circular holes or apertures 126 and 128 formed at the right end thereof. The distance which separates these holes is precisely predetermined to conform to a standard pitch diameter for a particular threaded configuration on a particular type of pipe or tubing. This parameter is predetermined by reference to the tables of standards which prevail in a particular industry, such as in the oil and gas industry. A series of these precalibrated pitch diameter bars 120 is provided, with the distances which separate the holes formed therethrough varying in each case in correlation to various predetermined pitch diameters which it may be desired to pre-set upon the gauge from time to time in a manner and for a purpose hereinafter described. It should be pointed out that the diameters of the holes 122–128 conform, with substantial precision, to the diameters of the circular cross-sectioned bar pins 59 carried at the upper or outer ends of each of the thread engaging blades 56. In use, one of the pitch diameter bars 120 is secured across the outer ends of the thread engaging blades by engagement of the bar pins 59 carried thereon with selected holes or apertures at opposite ends of the selected pitch diameter bar.

USE AND OPERATION OF THE INVENTION

The thread gauge of the invention is susceptible to use in several ways. One of the most frequent field uses of the gauge is to determine whether a threaded pipe end conforms to specified standards in its thread array. For this purpose, the thread gauge of the invention can be used to determine whether a specified pipe, for example, 4½ inch nominal outside diameter buttressed thread casing, conforms in its thread array to the industry specifications as published, for example, in the tables of specifications of the American Petroleum Institute.

Reference to such tables will indicate that the pitch diameter for this type of thread on 4½ inch casing should be 4.454 inches. The taper of the standard buttress thread on this type of 4½ inch casing is indicated by the standards table to be 0.0625 inch per inch.

In order to determine whether the 4½ inch casing stock available in the field conforms to these API standards specified for buttress casing thread, the thread gauge of the invention is used to compare the pitch diameter actually present on a section of casing to be gauged in the field to the standard pitch diameter, and to also gauge and compare the thread taper with the standard thread taper. By these measurements, it can be determined whether the stand-off and axial draw of the gauged casing section will be proper to assure correct joint tightness.

Initially, the standard taper can be set up on the gauge by assuring that the angle included between the blades, as they diverge from each other in a direction from the scale rail toward the outer ends of the blades, conforms precisely to the standard taper specified in the API standards table. This is accomplished by utilizing the pivoting blades 56 in a sine bar type of operating employing the trigonometric function of the angle between the inner relatively sharp edge of each blade and a line extending normal to the longitudinal axis of the scale rail. The portion of each blade 56 between the pivot pin 54 and stop pin 66 here corresponds to the usual sine bar. Standardized blade stop plates of the type shown in FIGS. 8 and 9 correspond in their function to the gauge blocks customarily used in conjunction with a sine bar for establishing a particular angle. These plates function to limit the pivotal movement of each blade and its associated toe portion to a precise degree, corresponding to the desired angle at which the respective blade must extend to the longitudinal axis of the plate 12 in order to provide the angulation corresponding to a given standard taper for a tapered thread to be gauged. Although it is possible to use the thread gauge by angling only one of the thread engaging blades with respect to the longitudinal axis of the scale rail 10 while maintaining the other blade in a true normal extension to this axis, and thereby include the total angulation required to set a selected standard taper on the gauge, it is preferred to angle both arms by an equal degree with respect to the rail axis by using the selected blade stop plate for sequentially setting each of the two blades to the same degree of angulation.

The blade stop plates which are provided, and two of which are shown in FIGS. 8 and 9, are precisely dimensioned and configured to provide a series of standards to be used in setting predetermined thread taper standards into the angulated blade pair. Thus, for example, it may be assumed for purposes of discussion that the particular stop plate 112 illustrated in FIG. 8 is one in which the transverse distance between the side edge 117c of this stop plate and the side segment 117b is precisely determined, so that when the stop pin 66 carried on the inner portion of one of the blades 56 swings against and abuts the side segment 117b, the particular blade carrying that stop pin will then define an acute angle with a line extending normal to the axis of the scale rail which is precisely one-half the total angle which must be defined between the two divergent blades in order to correspond exactly to that angle defined between lines extended tangent to the crests of standard tapered buttress threads for 4½ inch casing at diametrically opposite sides of the thread course. This stop plate is, of course, in such example, selected by reason of the fact that it is pre-marked as being the particular plate to use for a taper of 0.0625 inch per inch in a buttress casing—the specified standard for that type of thread. The number of such blade stop plates which must be provided to accomplish the gauging of taper on various sizes of buttress thread casing is reduced by the fact that the taper of the thread course is standardized at the same value for all sizes of buttress thread casing up to 13⅜ inch outside diameter, and a different value is used for the standard taper of all casing having a larger outside diameter than 13⅜ inch.

While discussing the configuration of the blade stop plates of the type typified by those shown in FIGS. 8 and 9, it should be pointed out that except for the perfectly square blade stop plate shown in FIG. 9, all of the other blade stop plates used have the notched characteristic, where one of the side edges is divided into two parallel segments which are spaced different distances from the opposed side edge of the plate. From the ensuing description of the manner in which the blade stop plates are positioned and used, it will be understood that by inversion, or turning over of these notched blade stop plates, it is possible to place either of these segments in the arcuate path of movement of the stop pin 66 carried on the inner end of the respective blade 56. Thus, depending on which way the stop plate is supported upon the respective L-shaped stop plate bracket 74, the respective thread engaging blade 56 will be able to either swing through a line extending normal to the axis of the scale rail to a location where the free end of the blade is outwardly thereof, and thus defines an acute angle of the type needed to gauge the taper of threads on a pin end, or will swing past the line extending normal to the axis of the scale rail to a position of inclination opposite that first described in order to define an enlarging angle (toward the end of the pipe) as typified by the thread taper on a box end. The distance which separates the two segments (as exemplified by segments 117a and 117b in plate 112) from each other is such that the standard box taper set by using the inset segment of a particular blade stop plate will correlate precisely to the mating or correlating pin taper which is gauged when the same stop plate is inverted, and the stop pin 66 carried on the respective blade 56 then caused to swing against the outer segment of that stop plate. In other words, each notched stop plate is sized to permit the same plate to be used in gauging both the threads on the pin end of a pipe or tubing section, and the threads on a box end which will properly make up with that pin end.

The square stop plate 114 is used only in that condition where the threads to be gauged are straight and have no taper.

Proceeding further with the discussion of the example of gauging 4½ inch buttress thread casing, and assuming that the stop plate 112 shown in FIG. 8 is the standard stop plate in use for establishing whether a section of the casing has thread characterized by the proper external, pin-type taper, the stop plate is first set into the L-shaped stop plate brackets 74 carried on the forward block 26 of the blade block assembly 20. The stop plate 112 is placed on the stop plate bracket 76 so that the side edge which intersects the segment 117b rests upon the leg 76 of the bracket and the side edge 117c thereof abuts the leg 80. The notch 82 provided at the intersection of the legs 76 and 80 assures that there will be no interference between the stop plate 112 and the bracket 74 at this corner, and that the side edges of the stop plate coincide exactly, through abutment, with the edges of the legs 76 and 80.

With the stop plate thus set upon the bracket 74, the toe portion 62 of the thread engaging blade 56 carried on the blade block assembly 20 extends behind a portion of the stop plate, and can swing in an arcuate path, as the blade is pivoted, in the space between the stop plate and the outer or forwardly facing surface of the forward block 26 of the blade block assembly 20. At this time, the guide and locking screw 68 carried on the toe portion 62 of the thread engaging blade has been loosened, so that this blade on the blade block assembly 20 can pivot freely. As pivotation of the blade about its pivot pin 54, by which it is mounted on the pivot neck 52, is continued, the toe portion 62 swings to the left, as viewed in FIG. 1, until the stop pin 66 comes in contact with the segment 117b of the side edge of the stop plate 112. When this occurs, further pivotal movement of the blade 56 is arrested, and the blade is, at this time, set in a precisely predetermined angle with respect to a line extending normal to the longitudinal axis of the plate 12 of the scale rail 10. This angle is precisely one-half of the angle which must be included between the divergent blades 56 in order to have them correspond to the standard taper of 0.0625 inch per inch for buttress threads carried on 4½ inch casing. Having set the blade 56 in this fashion, the guide and locking screw 68 is then tightened to lock the blade at this location, and in this angular relation with respect to the blade block assembly 20.

The same operation is then repeated with respect to the other thread engaging blade 56 carried on the blade block assembly 22. In other words, the stop plate 112 is removed from the L-shaped bracket 74 carried on the blade block assembly 20, and moved to the other of the two blade block assemblies 22, where it is placed in a corresponding position on the L-shaped stop plate bracket 74 carried on that blade block assembly. Again it is positioned in the pin taper measuring attitude, which is that in which the segment 117b is positioned for interception of the pivoting stop pin 66 carried on the toe portion 62 of the thread engaging blade 56. The thread engaging blade 56 mounted on the blade block assembly 22 is then pivoted in the manner previously described, with the toe portion 62 passing behind the stop plate 112, and continuing to move in an arcuate path of movement until the stop pin 66 comes in contact with the segment of the side edge 117b of the stop plate. When this is accomplished, the guide and locking screw 68 which projects through the slot 70 formed in the forward block 26 is again set to a locking position to hold the thread engaging blade fast in its precise angular relationship to the longitudinal axis of the plate 12 of the scale rail 10, and in the desired angular relationship with respect to the other of the two blades.

At this point, the two blades 56 have been set so that they are angularly positioned for determining whether, as the gauge is subsequently used, a pipe end to be gauged, and carrying an external buttress thread course thereon, conforms to the standard specified for 4½ inch buttress thread casing.

The next step in the use of the thread gauge of the invention is to determine the standard pitch diameter characteristic of the 4½ inch buttress thread casing, and the standard distance from the plane in which the pitch diameter is measured to the end of the pipe. The pitch diameter is here defined as a diameter measured to points located midway between the major and minor diameters of the thread course at opposite sides of the casing section. Since the facing or opposed edges 56b of the divergent blades 56 are to be used in the gauging procedure, and will contact, during gauging, the crests of the threads (and thus, will be tangent at the major diameter of the threads), it is necessary to add the thread height, also ascertainable from the tables of standards, to the specified pitch diameter in order to obtain an actual spacing of the blades as established between the opposed or facing edges 56b of the two blades 56 as they are to be used for gauging an external buttress thread. There is no need, however, for the man using the gauge in the field to understand this relationship, since the pitch diameter bars 120, provided for use as a portion of the gauge, are made up to correspond to various standard pitch diameters, and it is merely a matter of selecting and using the proper pitch diameter bar in carrying out the next step of this particular manner of use of the gauge. Thus, the gauger will select one of the pitch diameter bars 120 which is marked to indicate that it is to be used in gauging 4½ inch buttress casing. In the use of the pitch diameter bar 120, the bar pins 59 carried near the outer ends of each of the blades 56 will be inserted through the outer holes 122 and 128 in the two pairs of holes or circular apertures provided adjacent each end of the selected pitch diameter bar. Stated differently, the bar pins 59 are pressed into the registering circular apertures which are closest adjacent the opposite ends of the selected pitch diameter bar, since these apertures are provided for use where an external, enlarging or pin-type thread course is being gauged. The inner holes 124 and 126 are used for gauging a mating or complementary box-type thread course.

When the selected pitch diameter bar 120 has been so positioned in engagement with the bar pins 59 carried at the outer ends of the blades 56, these blades will then be located a precise distance from each other which corresponds to the pitch diameter standard for the 4½ inch buttress threaded casing sections.

It should be pointed out that in using the pitch diameter bar 120 in the manner described, the blade block assemblies 20 and 22 can be slid along the elongated, flat plate of the scale rail 10 by loosening the tightening screws 28 and the set screws 32 and 34 to permit such sliding movement, and the blade block assemblies then adjusted in their spacing along the scale rail until engagement with the precisely spaced holes in opposite ends of the selected pitch diameter bar can be effected.

With the pitch diameter bar thus placed, the blade block assemblies 20 and 22 are locked in this position on the scale rail by setting up on the set screws 32 and 34. In general, the tightening screws 28 need not be used unless a firmer and more permanent setting of the particular blade block assembly on the scale rail is desirable. Setting the set screws 32 and 34 to their holding position will lock the two blade block assemblies in their spatial relation to each other, so that the thread engaging blades are precisely spaced from each other in conformity to the predetermined standard pitch diameter of 4.454 inches which characterizes a perfectly formed thread on the end of a 4½ inch buttress thread casing section. After standardizing the spacing between the blade block assemblies in the manner described, the pitch diameter bar 120 can be removed by slipping it off the bar pins 59 so that the space between the diverging blades 56 is opened up to provide an open throat capable of receiving the threaded end of the buttress thread casing.

In the final operation before actually gauging the casing section against the standard for such casing, the tables of standards are again consulted to determine the distance which will exist between the diametric plane in which the pitch diameter is measured, and the end of the threaded casing section. Having determined this distance, it is measured off on the length of each of the thread engaging blades 56 from the center of the bar pin 59 to a point inwardly on each blade. At the latter point, a transverse line or mark is made on each of the blades by using a suitable marking instrumentality, such as chalk or the like.

Upon completion of the marking operation, the gauge has been placed in condition and proper status for use in gauging the casing thread. At this time, holding the plate 12 of the scale rail 10 in the fingers, the end of the buttress thread casing section is inserted between the divergently angled blades 56, and the gauge is gently moved upwardly over the end of the casing section until the crests of the threads contact the sharp inner or facing edges 56b of the two blades 56.

At the time that such contact is established between the crests of the threads at opposite sides of the thread course with the relatively sharp inner or facing edges of the blades 56, one of several conditions may be observed to exist. First, the edges of the blades 56 may connect all of the crests of the threads in the thread course at opposite sides of the casing section, with the end or terminus of the casing section precisely aligned with the transverse mark placed on the blades 56 in correspondence to the standardized distance from the plane of the pitch diameter to such end. Where this condition exists, it will be indicative that the buttress thread at that end of the casing section conforms precisely to the standards established for such thread on this size of casing. As will be pointed out hereinafter, a further operation is desirable to assure that an out-of-round condition does not characterize the threaded end of the casing.

A second condition which may be perceived to obtain when the end of the casing section is placed between the blades 56 of the gauge is that the end of the casing may extend past the marks scribed on the blades as indicative of the standard distance from the standard pitch diameter plane at which the end of the casing should be located. Preception of this condition to exist will indicate to the gauger that the pitch diameter of the casing section being gauged is less than it should be, according to the standard, and that the casing section being gauged should either be discarded form rethreading, or at least made up only with an identically anomalous, off-specification internally threaded coupling which is non-standard to precisely the same extent and degree as that found to be off-specification by such gauging procedures.

A third condition which may be found to exist upon gauging in the manner described is that the end of the casing will terminate short of the marks scribed on the blades 56 or, stated differently, will not extend as far toward the rail 10 as the scribe marks indicate that it should. This condition indicates to the gauger that the pitch diameter of the casing section undergoing gauging is too large as compared to the standard.

It is also possible, of course, to tell from a condition in which the facing edges of the blades 56 fail to contact all of the crests of the threads along the "perfect thread" section of the threaded end of the casing being checked that the taper provided in the thread is incorrect. Thus, where the outer ends of the blades are spaced away from the threads, and contact with the crests of the threads occurs only near the end of the casing, the taper of the thread course on the casing section is thereby indicated to be too low or small as compared to the standard. The reverse condition in which the degree of taper or incline of the taper is too large as compared to the standard results in the outer ends of the blades contacting the thread course, and the inner ends of the blades located toward the rail 10 being spaced from the threads.

The same procedure is used in gauging the internal threads of the couplings used in joining the casing sections, except, of course, that the blades 56 are reset using the blade stop plates in the manner previously described.

In addition to the use of the thread gauge in the manner described, the gauge can be used for determining the existence of an out-of-round condition at the threaded end of a casing section. Trueness of the circular cross-section of the thread course, of the lack of such trueness, is established by pivoting the thread gauge about the longitudinal axis of the casing section through arcs of 60° or 90°, and repeating the gauging process above described several times. If the end of the casing section is truly round, and no diametric distortions exist due to an out-of-round condition, the cooperation between the edges of the blades 56 and the thread course will be the same at every point of application of the gauge to the casing section.

Instead of using the gauge in the manner described in which precalibrated pitch diameter bars are employed for setting the linear spacing between the edges of the blades 56, precision setting where exact gauging of a non-standard thread is required can be accomplished by the use of the scale bar 16 and micrometer assembly 90. The scale bar 16 is preferably graduated in such a way that the pitch diameter which corresponds to a specific blade spacing is directly readable from the scale bar, and the micrometer assembly then provides fine interpolations within the coarser pitch diameter readings provided on the scale bar. It will be perceived that the action of the micrometer assembly 90 is to enable very fine adjustment of the linear position of the blade block assembly 22 on the scale rail 10. As the micrometer knob 110 is rotated, the extendible micrometer rod 108 is caused to be extended increasingly from the micrometer barrel 106 and in doing so, pushes against the micrometer rod stop pin 84 carried on the bracket 74 which is fixed to the forward block 26 of the blade block assembly 22. A very slight linear movement of the blade block assembly 22 is thus caused to occur along the scale rail 10, so that the position of the blade 56 carried thereon in relation to the second blade 52 on the blade block assembly 20 can be very precisely adjusted.

It is also possible to set any desired included angle between the blades 56, and thus to gauge or measure any thread taper, by using any suitable angle measuring device, or by directly marking on the gauge the degrees of included angle adjacent a moving portion of the blade, such as the toe portion 62, in a manner similar to that disclosed in the McGaffey patent. The linear spacing of 3 inches between each of the pivot pins 54 by which the blades 56 are mounted upon their respective pivot necks 52, and the respective stop pin 66 is selected so that the distance the stop pin must pivot away from the line perpendicular to the longitudinal axis of the rail 10 in order to set the blade for a desired taper involves a very simple mathematical calculation.

Thus, where, for example, it is desired to achieve a setting of the blades 56 which correlates to a taper of ¾ inch per foot, the distance constituting the short side of a triangle in which the three-inch dimension previously described is the longest of the other two non-hypotenuse sides should be 3/32 inch, or one-eighth of the desired magnitude of inches per linear foot of taper as measured along the crest of the threads. The distance, as measured for each of the blades along the path of movement of the stop pin 66 from the normal, is 3/32 inch since the taper refers to the taper as defined by the entire included angle as measured between both of the equally inclined blades. In another way of viewing the manner of setting the blades where the stop plates are not used, the thread taper (in inches per foot) which it is desired to gauge is divided by eight, and this linear distance is then made the leg of the triangle represented by the linear distance that the stop pin must be pivoted from its position in which the blade axis extends normal to the longitudinal axis of the plate 12 of the scale rail 10.

Finally, it should be pointed out that the thread gauge of the invention can be utilized for the purpose of cutting a new thread of selected taper and pitch diameter on the end of a pipe or tubular element.

An alternate embodiment of the invention is shown in FIGS. 10–13. This form of the invention is especially useful for precision work in the field, and for precise gauging determinations where no special pre-calibrated pitch diameter bars are available. In the embodiment illustrated in FIG. 10, the gauge includes a scale rail 134 which is made up of an elongated plate 136 having an elongated, longitudinally extending slot 138 formed over a major portion of the length thereof. A scale bar 140 is secured to the lower portion of the plate 136 by any suitable means, and carries graduation indicia 142 spaced horizontally along the length thereof.

At the left end of the scale rail 134, the rail carries a blade block assembly 144 which is similar in its general construction to the blade block assembly 20 hereinbefore described. The blade block assembly 144 thus includes a forward block 146 having its lower edge abutting the lower edge of the scale bar 140 and secured by suitable screws or rivets 147 to the plate 136. The forward block 146 projects upwardly in the manner shown in FIG. 12 and includes, in addition to the lower portion which abuts the scale bar 140, a slot-defining central portion 148 and an elongated neck portion 150. The elongated neck portion 150 projects from the upper side of the plate 136 of the scale rail 134, and terminates at its upper end in a free upper or outer edge 152.

Secured to the neck portion 150 of the forward block 146 at a location near the edge 152 by means of a pivot pin 154 is a thread engaging blade 156. The thread engaging blade 156 is constructed very similarly to the thread engaging blades 56 hereinbefore described, and is an elongated, substantially rectangular element, having rectangular notches 156c and 156d adjacent its upper end, a laterally extending toe portion 160 at its lower end and tapering to relatively sharp edges 156a and 156b at its opposite edges. A bar pin 161 projects outwardly from, and normal to, the face of the blade 156 near the upper edge thereof. The blade 156 also carries a stop pin 163 on the toe portion 62.

Two of the thread engaging blades 156 which are identically constructed are employed in the embodiment of the gauge of the invention illustrated in FIGS. 10–13, and the second of these thread engaging blades will be hereinafter described with reference to its mounting upon the second of the two blade block assemblies which are utilized in this embodiment of the invention.

Figure 10:
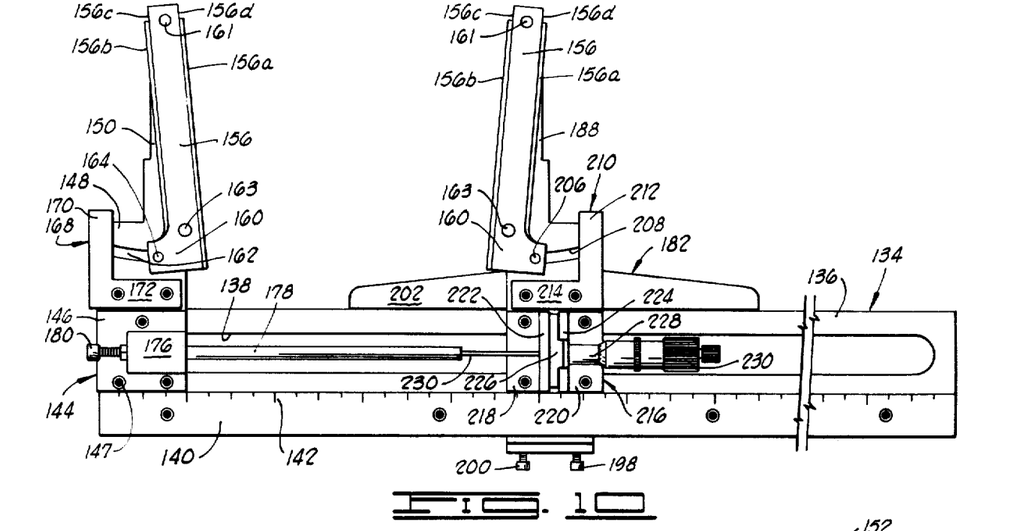
FIG. 10 is a front elevation view of a modified embodiment of the thread gauge of the invention.
Figure 12:
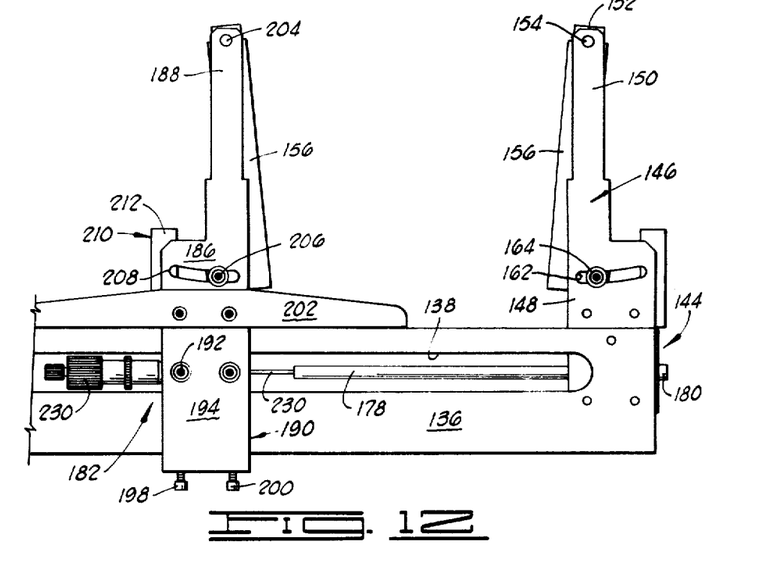
FIG. 12 is a fractional rear elevation view of the left end of the thread gauge shown in FIG. 10.

It will be noted in referring to FIGS. 10 and 12 that the central portion 148 of the forward block 146 has an arcuate slot 162 formed therein for receiving an adjustable guide and locking screw 164 of the type hereinbefore described. The adjustable guide and locking screw 164 projects through the toe portion 160 of the blade 156 from the forward side thereof, through the slot 162 and terminates in a washer or other stop member at the rear side thereof so that it can be tightened to hold the thread engaging blade 156 at a selected angular orientation in relation to a line extending normal to the axis of the plate 136, in the manner hereinbefore described.

An L-shaped blade stop plate bracket, designated generally by reference numeral 168, is mounted upon the central portion 148 of the forward block 146 of the blade block assembly 144 and includes an outwardly projecting leg 170 and a horizontally projecting leg 172. Spaced inwardly on the rail 134 from the blade stop plate bracket 168 is a calibrated rod socket block 176. The rod socket block 176 is provided with a cylindrically cross-sectioned deep bore or recess formed in one side thereof for the purpose of receiving an elongated, calibrated pitch diameter rod 178. The depth of the bore or recess in which the pitch diameter rod 178 is seated is sufficient to assure that the pitch diameter rod will extend substantially precisely parallel to the axis of the rail 134 when it is mounted in this bore or recess.

On some occasions, it is necessary to calibrate the precise depth of the bore or recess which receives the pitch diameter rod 168, and to this end an adjusting screw 180 is threaded into the left side of the block 176 in alignment with the bore or recess therein which receives the pitch diameter rod 178, and the inner end of the screw 180 can be adjusted inwardly to vary the effective depth of the bore or recess, and thus to change the distance which the calibrated pitch diameter rod 178 extends in a horizontal direction from the block 176.

Figure 11:
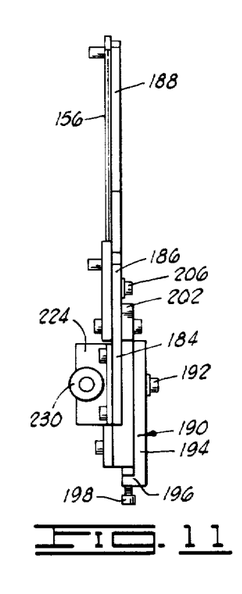
FIG. 11 is an end elevation view of the thread gauge illustrated in FIG. 10.

The embodiment of the invention illustrated in FIGS. 10–13 further includes a second blade block assembly designated generally by reference numeral 182. The second blade block assembly 182 is slidably mounted upon the rail 134 and includes a forward block 184 which has a straight lower edge resting upon the scale bar 140, an intermediate or central portion 186 and a neck portion 188. It is believed that the forward block 184 of the blade block assembly 182 is adequately described by indicating that it is substantially identical in construction to the forward block 146 of the blade block assembly 144. The forward block 184 of the blade block assembly 182 abuts flatly against the forward side of the plate 136 of the scale rail 134, and is connected through the slot 138 to an L-shaped rear block, designated generally by reference numeral 190 by means of suitable tightening screws 192. The L-shaped rear block 190 includes a back plate 194 and a foot plate 196. The foot plate 196 carries a pair of spaced threaded apertures extending therethrough for the purpose of receiving set screws 198 and 200 as shown in FIGS. 10–12. For the purpose of stabilizing the blade block assembly 182 on the scale rail 134, an elongated generally trapezoidally shaped stabilizer plate 202 is secured to the central or intermediate portion 186 of the forward block 184 at a location immediately over the upper edge of the plate 136 of the scale rail 134, so that the edge of the stabilizer plate 202 bears against the upper edge of the plate 136 and prevents canting or wobbling of the blade block assembly 182 on the scale rail.

Secured to the upper end of the neck portion 188 of the forward block 184 of the blade block assembly 182 is a second of the thread engaging blades 156. This second thread engaging blade 156 is secured to the upper end of the neck portion 188 of the forward block 184 by means of a suitable pivot pin 204 and, as previously explained, is constructed identically to the thread engaging blade 156 hereinbefore described. It thus is characterized in having opposite, relatively sharp edges 156a and 156b, and a toe portion 160. A guide and locking screw 206 extends from the toe portion 160 of the thread engaging blade 156 through an arcuate slot 208 formed through the central or intermediate portion 186 of the forward block 184 of the blade block assembly 182.

Secured to the forward side of the forward block 184 of the blade block assembly 182 is an L-shaped blade stop plate bracket, designated generally by reference numeral 210. The bracket 210 includes an outwardly extending leg 212 and a leg 214 which is secured to the block 184 and extends substantially normal to the leg 212.

A fine adjustment micrometer assembly designated generally by reference numeral 216 is secured to the forward or facing surface of the forward block 184 immediately beneath the blade stop plate bracket 210 and in a position to bear, at its straight lower edge, against the scale bar 40. The fine adjustment micrometer assembly 216 includes a pair of angle plates 218 and 220 which are screwed to the forward block 184 of the blade block assembly 182, and include outwardly projecting, substantially parallel flanges 222 and 224. A receiving block 226 is positioned between the flanges 222 and 224 and facilitates the mounting thereto of a micrometer barrel 228. A micrometer needle 230 projects from the opposite side of the receiving block 226, and through the flange 222 in horizontal alignment with the pitch diameter rod 178. A knurled adjusting knob 232 forms a final portion of the micrometer assembly 216, and can be used with suitable graduations on the barrel 228 to facilitate the advancement or retraction of the micrometer needle 230 by a precise, indicated amount.

In the operation and use of the embodiment of the thread gauge illustrated in FIGS. 10–13, the principles of usage, and the structural elements employed, are generally the same as those previously discussed in referring to the embodiments shown in FIGS. 1–9. It will be noted, however, that by placing the pivot pins 154 and 204 adjacent the outer or upper edges of the blade engaging plates 156, a variation in the angular setting of the blade engaging plates with respect to each other, in order to set a particular taper gauging arrangement on the blade, does not affect a pitch diameter setting as established between the bar pins 161 by the use of a rigid pitch diameter bar extended therebetween, or by an actual precisely measured setting of the pitch diameter as hereinafter explained. Stated differently, the thread engaging blades 156 can be adjusted in their angular relationship to lines extending normal to the longitudinal axis of the plate 136 of the scale rail 134 (to any desired angular position) for the purpose of measuring any thread taper, without being concerned with altering the pitch diameter of the thread to be gauged as established by the distance between the center points of the bar pins 161.

Figure 13:
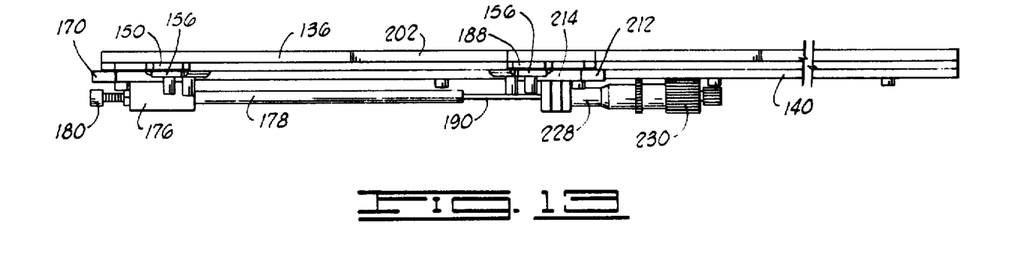
FIG. 13 is a top plan view of the thread gauge shown in FIG. 10.

The other departure of significance from the embodiment of the invention previously described is the inclusion of the rod socket block 176 and adjusting screw 180 provided for cooperation with a pitch diameter rod in the manner best illustrated in FIGS. 10 and 13. In using the rod socket block 176, a pitch diameter rod 176 which has been precalibrated, and is a standard rod of an even number of inches in length, is inserted in the cylindrically cross-sectioned deep bore formed in the block 176, and projects horizontally along the axis of the plate 136 of the scale rail 134 in the manner illustrated in FIG. 10. Generally, the cylindrically cross-sectioned deep bore or recess into which this rod is inserted will be of a specific even fraction of an inch such as one-half, one-fourth or one full inch. Preferably, the recess is one inch in depth. This will then permit an even number of inches of the pitch diameter rod to extend along the scale rail over the scale bar 140. The micrometer assembly 216 can then be utilized to obtain a fine reading up to the nearest 10/1000th of an inch. When the micrometer needle 230 touches the end of the pitch diameter rod 178, the reading on the micrometer assembly is added to the even number of inches in length of the pitch diameter rod to provide a precise indication of the distance which separates the two bar pins 161. Thus, the thread engaging blades 156 have been disposed in a precise pitch diameter spacing as determined by the length of the pitch diameter rod 178, plus the added increment determined from the micrometer assembly. As previously noted, this setting of the blades at a selected or measured thread pitch diameter is effectual for this purpose regardless of the angulation of the blades for taper measuring purposes.

The described arrangement permits a very accurate check to be made of the calibrated pitch diameter bars used in conjunction with the bar pins 161 in the manner hereinbefore described, and also enables the gauge to be used for determining the pitch diameter of a particular thread course which is to be measured on the end of a pipe without entailing any use of the standard pitch diameter bars hereinbefore described and shown in FIG. 7 of the drawings.

After the pitch diameter has been set upon the thread engaging plates 156 in one of the ways hereinbefore described, the particular taper which is to be gauged can be set upon the blades by the use of the blade stop plates hereinbefore described.

Although preferred embodiments of the invention have been herein described in order to illustrate the basic principles of the invention, it will be understood that various changes and modifications can be effected in the described structure without departure from such principles. Changes and modifications of this type are therefore deemed to be circumscribed by the spirit and scope of the invention except as the same may be necessarily limited by the appended claims, or reasonable equivalents thereof.

What is claimed is:

1. A pipe thread gauge comprising:
   an elongated rail;
   a pair of blade block assemblies slidably mounted on said rail for longitudinal sliding movement therealong;
   means for locking each of said blade block assemblies at a selected location along said rail;
   a thread engaging blade pivotally connected to each of said blade block assemblies, said blades having their pivotal axes on said blade block assemblies extending substantially parallel to each other, whereby said blades pivot in substantially the same plane, each of said blades including a toe portion swingable through an arc upon pivotation of the respective blade;
   means for selectively setting said blades at a selected angle to each other;
   means for selectively spacing said blades from each other a selected distance; and
   a stop pin carried on each of said blades and positioned to contact said blade angle setting means and stop further pivotation of the respective blade upon which it is carried when said blade extends at a selected angle to the other blade.

2. A pipe thread gauge as defined in claim 1 wherein each of said thread engaging blades includes a pair of relatively sharp opposed side edges.

3. A pipe thread gauge as defined in claim 1 and further characterized as including:
   an arresting screw carried on each of said toe portions; and
   means cooperating with each of said arresting screws for locking the blade upon which the respective arresting screw is carried against further pivotal movement on its respective blade block assembly.

4. A pipe thread gauge as defined in claim 1 wherein said means for selectively spacing said blades from each other comprises:
   a scale bar forming a part of said rail and having graduations marked thereon; and
   a micrometer subassembly slidably mounted on said rail and including a micrometer rod positioned to contact one of said blade block assemblies.

5. A pipe thread gauge as defined in claim 1 wherein said means for selectively setting said blades at a selected angle to each other comprises:
   a blade stop plate bracket secured to at least one of said blade block assemblies; and
   a blade stop plate retainable in said plate bracket and selectively dimensioned to encounter, and arrest the pivotal movement of, the blade on said one blade block assembly at a time when said arresting blade extends at a desired angle to said rail.

6. A pipe thread gauge as defined in claim 1 and further characterized as including:
   an elongated standard pitch diameter bar; and
   means interconnecting said pitch diameter bar to the free outer ends of said thread engaging blades for spacing said blades from each other in correspondence to a predetermined pitch diameter of a thread course to be gauged.

7. A pipe thread gauge comprising:
an elongated rail including:
  an elongated plate having an elongated slot extending longitudinally therealong; and
  a scale bar secured to said elongated plate;
a pair of blade block assemblies slidably mounted on said rail for longitudinal sliding movement therealong, each blade block assembly including:
  an L-shaped rear block flatly abutting one side of said elongated plate;
  a forward block flatly abutting the other side of said elongated plate;
  securing screws extended between and interconnecting said rear and forward blocks and extending through said slot; and
  set screws extending through said rear block in a direction normal to the direction of extension therethrough of said securing screws and selectively engageable with said scale bar;
  means for locking each of said blade block assemblies at a selected location along said rail;
  a thread engaging blade pivotally connected to each of said forward blocks of said blade block assemblies, said blades having their pivotal axes on said blade block assemblies extending substantially parallel to each other, whereby said blades pivot in substantially the same plane, each of said blades including a toe portion swingable through an arc upon pivotation of the respective blade;
  means for selectively setting said blades at a selected angle to each other;
  means for selectively spacing said blades from each other a selected distance; and
  a stop pin carried on each of said blades and positioned to contact said blade angle setting means and stop further pivotation of the respective blade upon which it is carried when said blade extends at a selected angle to the other blade.

8. A pipe thread gauge as defined in claim 7 wherein said means for selectively setting said blades at a selected angle to each other comprises:
an L-shaped stop blade bracket secured to the forward block of each of said blade block assemblies and including:
  a first leg extending coaxially along said elongated plate; and
  a second leg extending normal to said first leg; and
a pair of blade stop plates each having
  a first side edge abutting said second leg of said L-shaped stop bracket;
  a second side edge abutting said first leg of said L-shaped stop bracket;
  a third edge extending substantially parallel to said second side edge; and
  a notched side edge intersecting said second and third side edges and defining a notch, said notched side edge having said first segment spaced a selected distance from the first side edge of said blade stop plate, which distance is correlated to a first angular relationship of said blades to each other, and having a second segment spaced closer to said first side edge of said stop plate than said first segment, and by a distance which is correlated to a second angular relationship of the blades to each other, said first angular relationship defining an acute angle which enlarges toward the free outer end of the blades for purposes of measuring the taper of a pin-type thread, and said second angular relationship defining an angle between the blades which enlarges toward the inner end of said blades at which said toes are carried for purposes of measuring the taper of a box-type thread, said blade stop plates being selectively dimensioned to encounter, and arrest the pivotal movement of, the blades on their respective blade block assemblies, by contact thereof with the stop pins carried on each of said blades.

9. A pipe thread gauge as defined in claim 8 and further characterized as including:
an arresting screw carried on each of said toe portions; and
means cooperating with each of said arresting screws for locking the blade upon which the respective arresting screw is carried against further pivotal movement on its respective blade block assembly.

10. A pipe thread gauge as defined in claim 8 wherein said means for selectively spacing said blades from each other comprises:
a scale bar forming a part of said rail and having graduations marked thereon; and
a micrometer subassembly slidably mounted on said rail and including a micrometer rod positioned to contact one of said blade block assemblies.

11. A gauge for gauging a tapered course of helical internal or external threads on a pipe end comprising:
a pair of elongated blades each having opposed, longitudinally extending thread contacting blade edges at the opposite sides thereof;
elongated scale means movably supporting the blades in measured, spaced relation to each other, so that said blades extend from said scale means in the same general direction; and
means on said scale means for selectively placing the thread contacting edges of the blades which are farthest from each other in a selected first angular relationship to each other for measuring the taper and pitch diameter of a tapering helical internal thread on the inside of a pipe end, and for selectively placing the thread contacting edges of the blades which face, and are closest to each other, in a second angular relationship to each other for measuring the taper and pitch diameter of a tapering external helical thread on the outside of a pipe end, which external thread is dimensioned and tapered to mate precisely with said internal thread.

12. A gauge as defined in claim 11 and further characterized as including:
a first blade block assembly mounted on said scale means and pivotally connected to one of said blades to facilitate pivotation of said one blade about a pivotal axis which extends normal to a plane in which said blade block assembly is slidable movable along said scale means; and
a second blade block assembly slidably mounted on said scale means, and pivotally connected to the other of said blades to facilitate pivotation of said other blade about a pivotal axis which extends normal to a plane in which blade block assembly is slidable movably long said scale means.

13. A gauge as defined in claim 11 wherein said scale means includes:
an elongated plate having a slot extending longitudinally therein;
a scale bar secured to said plate having one edge thereof and extending parallel to said slot; and micrometer means movably mounted on said plate and cooperating with said scale bar for indicating the distance separating said blades from each other.

14. A gauge for gauging a tapered course of helical internal or external threads on a pipe end comprising:
a pair of elongated blades each having opposed, longitudinally extending thread contacting blade edges at the opposite sides thereof;
elongated scale means movably supporting the blades in measured, spaced relation to each other, so that said blades extend from said scale means in the same general direction; and
means on said scale means for selectively placing the thread contacting edges of the blades which are farthest from each other in a selected first angular relationship to each other for measuring the taper and pitch diameter of a tapering helical internal thread on the inside of a pipe end, and for selectively placing the thread contacting edges of the blades which face, and are closest to each other, in a second angular relationship to each other for measuring the taper and pitch diameter of a tapering external helical thread on the outside of a pipe end, which external thread is dimensioned and tapered to mate precisely with said internal thread, said placing means including:
a blade stop plate having two side edges extending normal to each other, and having a recessed side edge intersecting one of said two side edges, said recessed side edge having a first segment spaced a selected distance from the second of said first-mentioned two side edges which is correlated to said first angular relationship of the blades, and having a second segment spaced farther from the second of said first-mentioned two side edges than said first segment, and by a distance which is correlated to said second angular relationship of the blades; and
a bracket connected to said scale means for movement thereon, and including legs extending normal to each other, and sized for support of, and registry with, the first-mentioned two side edges of said blade stop plate.

15. A gauge for gauging a tapered course of helical internal or external threads on a pipe end comprising:
a pair of elongated blades each having opposed, longitudinally extending thread contacting blade edges at the opposite sides thereof;
elongated scale means movably supporting the blades so that said blades exist in measured, spaced relation to each other and extend from said scale means in the same general direction;
means on said scale means for selectively placing the thread contacting edges of the blades which are farthest from each other in a selected first angular relationship to each other for measuring the taper and pitch diameter of a tapering helical internal thread on the inside of a pipe end, and for selectively placing the thread contacting edges of the blades which face, and are closest to each other, in a second angular relationship to each other for measuring the taper and pitch diameter of a tapering external helical thread on the outside of a pipe end, which external thread is dimensioned and tapered to mate precisely with said internal thread, said placing means including:
a blade stop plate having two side edges extending normal to each other, and having a recessed side edge intersecting one of said two side edges, said recessed side edge having a first segment spaced a selected distance from the second of said first-mentioned two side edges, which distance is correlated to said first angular relationship of the blades, and having a second segment spaced farther from the second of said first-mentioned two side edges than is said first segment, and by a distance which is correlated to said second angular relationship of the blades; and
a bracket connected to said scale means for movement thereon and including legs extending normal to each other, and sized for support, and registry with, the first-mentioned two side edges of said blade stop plate;
a first blade block assembly mounted on said scale means and pivotally connected to one of said blades to facilitate pivotation of said one blade about a pivotal axis which extends normal to a plane in which said blade block assembly is slidably movable along said scale means; and
a second blade block assembly slidably mounted on said scale means, and pivotally connected to the other of said blades to facilitate pivotation of said other blade about a pivotal axis which extends normal to a plane in which said blade block assembly is slidably movable along said scale means.

16. A gauge as defined in claim 15 and further characterized as including a stop pin carried on each of said elongated blades and spaced from the pivotal axis thereof at a location where the respective stop pin will contact one of said first and second segments of said recessed side edge of a blade stop plate supported on said bracket when said blades undergo pivotation.

17. A gauge as defined in claim 16 wherein each of said blade block assemblies comprises:
a rear block flatly abutting said scale means on one side thereof;
a forward block flatly abutting said scale means on a side thereof opposite the side thereof against which said rear block is abutted;
securing screws extending between and interconnecting said rear and forward blocks; and
set screws extending through one of said rear and forward blocks and engageable with said scale means for setting the location of the respective blade block assembly at a desired location along the length of said scale means.

18. A pipe thread gauging device comprising:
an elongated scale rail;
a first blade block assembly mounted on said scale rail adjacent an end thereof, said first blade block assembly including a block having a neck portion projecting outwardly from the scale rail and normal thereto;
a rod socket block mounted on said blade block assembly, defining a bore having an axis extending substantially parallel to the axis of said elongated scale rail, and adapted for receiving a calibrated pitch diameter rod;
a first elongated thread engaging blade having one end pivotally secured to said neck portion at a location near the outer end of said neck portion which is most distally spaced with respect to said scale rail;
a second blade block assembly slidably mounted on said scale rail adjacent an end thereof, said second blade block assembly including a block having a neck portion projecting outwardly from the scale rail and normal thereto;

a second elongated thread engaging blade having one end pivotally secured to said neck portion of the second blade block assembly at a location near the outer end of said neck portion of said second blade block assembly which is most distally located with respect to said scale rail;

a micrometer assembly mounted on said second blade block assembly and including a micrometer barrel;

a micrometer needle extendible from said micrometer barrel and axially aligned with the bore in said rod socket block;

a rotatable knob rotatably mounted on said barrel and rotatable to extend said needle into contact with an end of a calibrated pitch diameter rod having its other end inserted in said bore; and means supported on each of said blade block assemblies and cooperating with said thread engaging blades for selectively angulating said blades with respect to each other for the purpose of gauging thread taper.

19. A pipe thread gauge comprising:

an elongated rail;

a pair of blade block assemblies slidably mounted on said rail for longitudinal sliding movement therealong;

means for locking each of said blade block assemblies at a selected location along said rail;

a thread engaging blade pivotally connected to each of said blade block assemblies, said blades having their pivotal axes on said blade block assemblies extending substantially parallel to each other, whereby said blades pivot in substantially the same plane, each of said blades including a toe portion swingable through an arc upon pivotation of the respective blade;

means for selectively setting one of said blades at an angle relative to the other of said blades, wherein said angle is one of the plurality of angles within the range of angles extending from an angle defined by the convergence of the one blade toward the other blade to an angle defined by the divergence of the one blade away from the other blade;

means for selectively spacing said blades from each other a selected distance; and a stop pin carried on each of said blades and positioned to contact said blade angle setting means and stop further pivotation of the respective blade upon which it is carried when said blade extends at a selected angle to the other blade.

20. A pipe thread gauge comprising:

an elongated rail including:

an elongated plate having an elongated slot extending longitudinally therealong; and a scale bar secured to said elongated plate;

a pair of blade block assemblies slidably mounted on said rail for longitudinal sliding movement therealong, each blade block assembly including:

a rear block abutting one side of said elongated plate;

a forward block abutting the other side of said elongated plate; and securing means extended between and interconnecting said rear and forward blocks and extending through said slot;

means selectively engageable with said scale bar for locking each of said blade block assemblies at a selected location along said rail;

a thread engaging blade pivotally connected to each of said blade block assemblies, said blades having their pivotal axes on said blade block assemblies extending substantially parallel to each other, whereby said blades pivot in substantially the same plane, each of said blades including a toe portion swingable through an arc upon pivotation of the respective blade;

means for selectively setting said blades at a selected angle to each other;

means for selectively spacing said blades from each other a selected distance; and a stop pin carried on each of said blades and positioned to contact said blade angle setting means and stop further pivotation of the respective blade upon which it is carried when said blade extends at a selected angle to the other blade.

* * * * *